(12) United States Patent
Yu et al.

(10) Patent No.: US 10,593,999 B2
(45) Date of Patent: Mar. 17, 2020

(54) ELECTRODE ASSEMBLY AND RECHARGEABLE BATTERY INCLUDING THE SAME

(71) Applicant: Samsung SDI Co., Ltd., Yongin-si, Gyeonggi-do (KR)

(72) Inventors: Jungyi Yu, Yongin-si (KR); Juseok Park, Yongin-si (KR); Minsu Kim, Yongin-si (KR); Youngtae Kim, Yongin-si (KR); Taikyeong Park, Yongin-si (KR); Seung-Woo Lyu, Yongin-si (KR); Daniel Ryou, Yongin-si (KR); Ji-hoon Lee, Yongin-si (KR); Ie Su Cho, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 99 days.

(21) Appl. No.: 15/719,386

(22) Filed: Sep. 28, 2017

(65) Prior Publication Data
US 2018/0090795 A1 Mar. 29, 2018

(30) Foreign Application Priority Data

Sep. 29, 2016 (KR) .................... 10-2016-0125690

(51) Int. Cl.
*H01M 10/42* (2006.01)
*H01M 10/04* (2006.01)
(Continued)

(52) U.S. Cl.
CPC ..... *H01M 10/4235* (2013.01); *H01M 2/0202* (2013.01); *H01M 2/263* (2013.01);
(Continued)

(58) Field of Classification Search
None
See application file for complete search history.

(56) References Cited

U.S. PATENT DOCUMENTS

2006/0289453 A1  12/2006  Oh et al.
2007/0154790 A1   7/2007  Jeung et al.

FOREIGN PATENT DOCUMENTS

KR      1999-002558 U      1/1999
KR    10-2004-0022718 A    3/2004
(Continued)

*Primary Examiner* — Daniel S Gatewood
(74) *Attorney, Agent, or Firm* — Lewis Roca Rothgerber Christie LLP

(57) ABSTRACT

An electrode assembly includes: a first electrode including a first electrode coated region and a first electrode uncoated region at one side of the first electrode coated region; a separator overlapping the first electrode; a second electrode including a second electrode coated region and a second electrode uncoated region at one side of the second electrode coated region; and a foreign particle preventing member on at least one of the first electrode uncoated region and the second electrode uncoated region. The second electrode coated region overlaps the first electrode coated region with the separator therebetween, and the foreign particle preventing member is repeatedly wound about an axis together with the first electrode, the separator, and the second electrode.

20 Claims, 9 Drawing Sheets

(51) Int. Cl.
  *H01M 2/26* (2006.01)
  *H01M 2/02* (2006.01)
  *H01M 10/052* (2010.01)
  *H01M 10/0587* (2010.01)

(52) U.S. Cl.
  CPC ...... *H01M 10/0431* (2013.01); *H01M 10/052* (2013.01); *H01M 10/0587* (2013.01)

(56) References Cited

FOREIGN PATENT DOCUMENTS

| | | | | |
|---|---|---|---|---|
| KR | 20040022718 | A | * | 3/2004 |
| KR | 10-0614404 | B1 | | 8/2006 |
| KR | 10-0853619 | B1 | | 8/2008 |

* cited by examiner

ELECTRODE ASSEMBLY AND RECHARGEABLE BATTERY INCLUDING THE SAME

CROSS-REFERENCE TO RELATED APPLICATION

This application claims priority to and the benefit of Korean Patent Application No. 10-2016-0125690, filed in the Korean Intellectual Property Office on Sep. 29, 2016, the entire content of which is incorporated herein by reference.

BACKGROUND

1. Field

Aspects of embodiments of the present invention relate to an electrode assembly and a rechargeable battery including the same.

2. Description of the Related Art

A rechargeable battery is a power storage device that converts electrical energy into chemical energy and stores it with excellent energy density. Unlike a primary battery that is not designed to be recharged, the rechargeable battery is designed to be recharged and, therefore, is widely used in information technology (IT) devices, such as smartphones, cellular phones, laptop computers, tablet computers, and the like.

Recently, interest in electric cars has increased due to problems, such as environment degradation and fossil fuel depletion, and rechargeable batteries are used to power electric vehicles. Accordingly, rechargeable batteries should desirably have characteristics including high energy density, high power, safety, etc.

Types of rechargeable batteries include lead-acid batteries, nickel-cadmium batteries, nickel hydrogen batteries, lithium ion batteries, lithium polymer batteries, lithium metal batteries, lithium air batteries, sodium air batteries, etc. A rechargeable battery using lithium generally has a higher operating voltage and greater energy density per unit weight than other types of rechargeable batteries, and therefore, lithium rechargeable batteries are increasingly being applied to portable IT devices and electric vehicles.

When a short circuit occurs therein, combustion and explosion may occur due to strong reactivity of the lithium in the lithium-based rechargeable battery. As such, a safe structure in which a short circuit between electrodes may not occur even though charging/discharging are repeatedly performed is desired. A more safe and easily manufactured electrode assembly structure for a rechargeable battery is being developed.

Of well-known electrode assembly structures there is, first, a spiral-wound electrode assembly structure in which positive and negative electrodes with a separation membrane therebetween are rolled and, second, a stacked electrode assembly structure in which positive and negative electrodes are cut to a size of the battery and are alternately stacked with a separation membrane therebetween.

In the spiral-wound electrode assembly structure, a plurality of thin layers overlap each other due to being repeatedly wound (e.g., due to a winding process that is repeatedly performed), and a welding process may be performed to integrate the overlapped uncoated regions to reduce resistance of the overlapped uncoated regions. In addition, a current collector may be welded to the uncoated region to draw out a current outside of a case.

An ultrasonic welding process may be used to integrate the overlapped uncoated regions, but vibration occurs and particles may be generated at contacting surfaces between a horn and a substrate during the ultrasonic welding process.

The generated particles may move to the inside of the electrode assembly due to the vibration generated during the ultrasonic welding process, and because the particles include metal materials, such as copper or aluminum separated from the substrate, a short circuit may occur when they move inside the electrode assembly.

The above information disclosed in this Background section is only for enhancement of understanding of the background of the invention and it may contain information that does not form prior art.

SUMMARY

Embodiments of the present invention provide an electrode assembly and a rechargeable battery that may prevent foreign particles generated during an ultrasonic welding process from moving inside of the electrode assembly and causing a short circuit.

An exemplary embodiment of the present invention provides an electrode assembly including: a first electrode including a first electrode coated region and a first electrode uncoated region at one side of the first electrode coated region; a separator overlapping the first electrode; a second electrode including a second electrode coated region and a second electrode uncoated region at one side of the second electrode coated region; and a foreign particle preventing member on at least one of the first electrode uncoated region or the second electrode uncoated region. The second electrode coated region overlaps the first electrode coated region with the separator therebetween, and the foreign particle preventing member is repeatedly wound about an axis together with the first electrode, the separator, and the second electrode.

The foreign particle preventing member may extend along a first boundary between the first electrode coated region and the first electrode uncoated region or along a second boundary between the second electrode coated region and the second electrode uncoated region.

A width of the foreign particle preventing member in a direction parallel to the axis may be smaller than a length thereof in a direction crossing the axis.

A distance from an end of the first electrode uncoated region to the first boundary may be greater than the width of the foreign particle preventing member or a distance from the second electrode uncoated region to the second boundary may be greater than the width of the foreign particle preventing member.

The foreign particle preventing member may include an adhesive tape.

The width of the foreign particle preventing member may be in a range of about 1 mm to about 10 mm.

The foreign particle preventing member may include an insulation resin.

The width of the foreign particle preventing member may be in a range of about 0.3 mm to about 10 mm.

The foreign particle preventing member may be on both opposite surfaces of the at least one of the first electrode uncoated region or the second electrode uncoated region.

The first electrode uncoated region and the second electrode uncoated region may be at opposite sides of the electrode assembly with respect to the first electrode coated region and the second electrode coated region.

The electrode assembly may further include another foreign particle preventing member at an edge of the separator.

Another exemplary embodiment of the present invention provides an electrode assembly including: a first electrode including a first electrode coated region and a first electrode uncoated region at one side of the first electrode coated region; a separator overlapping the first electrode; a foreign particle preventing member at an edge of the separator; and a second electrode including a second electrode coated region and a second electrode uncoated region at one side of the second electrode coated region. The second electrode coated region overlaps the first electrode coated region with the separator therebetween, and the foreign particle preventing member is repeatedly wound about an axis together with the first electrode, the separator, and the second electrode.

The foreign particle preventing member may surround an end portion of the separator.

The foreign particle preventing member may be on opposite surfaces of the separator.

The foreign particle preventing member may include an adhesive tape or an insulation resin.

A width of the foreign particle preventing member in a direction parallel to the axis may be about 10 mm or less.

Another exemplary embodiment of the present invention provides a rechargeable battery including: an electrode assembly including first and second electrodes and a separator between the first electrode and the second electrode, each of the first and second electrodes including an electrode uncoated region and an electrode coated region; a foreign particle preventing member on the electrode uncoated regions of at least one of the first and second electrodes; a case accommodating the electrode assembly and having an opening at one side thereof; and a cap plate coupled to the case at the opening. The first electrode, the second electrode, the separator, and the foreign particle preventing member are repeatedly wound about an axis.

The foreign particle preventing member may extend along a first boundary between the first electrode coated region and the first electrode uncoated region or along a second boundary between the second electrode coated region and the second electrode uncoated region.

The foreign particle preventing member may include an adhesive tape or an insulation resin.

A width of the foreign particle preventing member in a direction parallel to the axis may be about 10 mm or less.

According to embodiments of the present invention, it is possible to minimize or reduce the occurrence of a short circuit and the like due to foreign particles generated during the ultrasonic welding process by forming the foreign particle preventing member.

DETAILED DESCRIPTION

Figure 1:
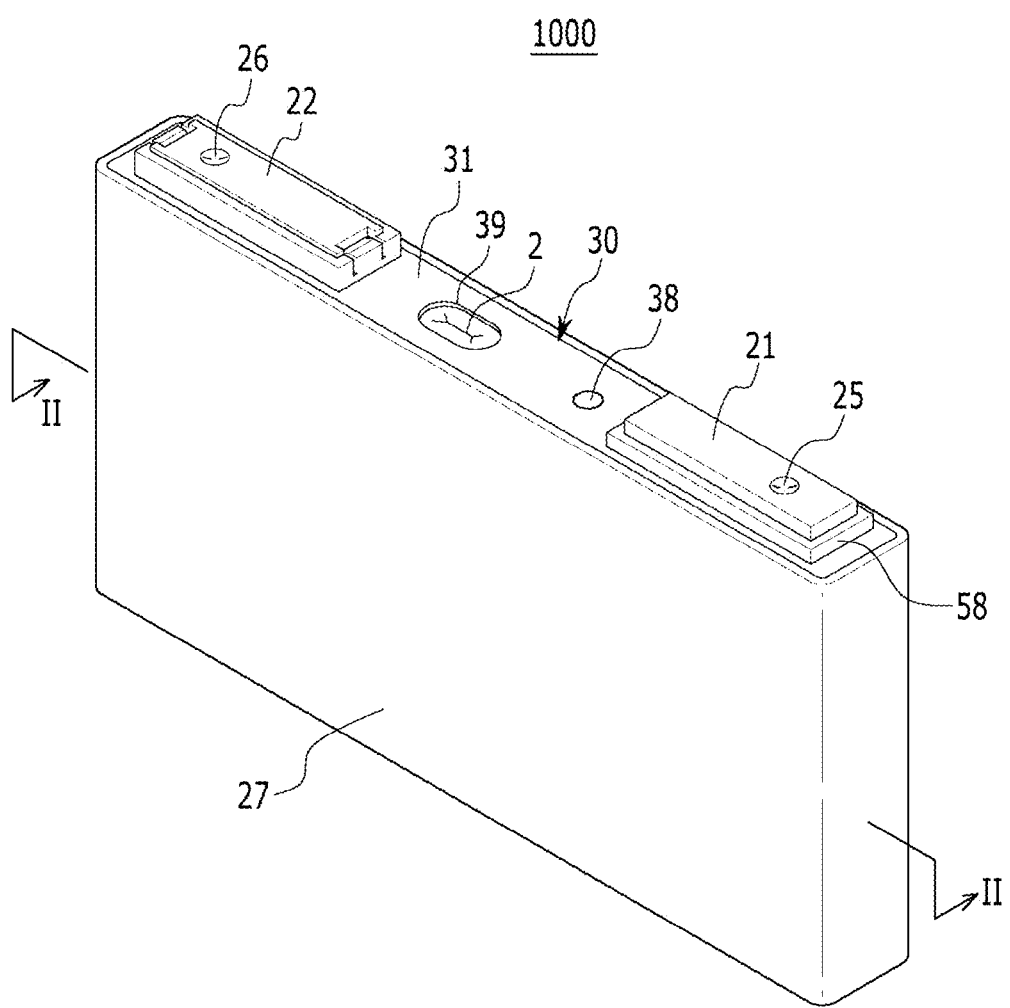
FIG. 1 is a schematic perspective view of an electrode assembly for a rechargeable battery according to an exemplary embodiment of the present invention.

The present invention will be described more fully hereinafter with reference to the accompanying drawings, in which exemplary embodiments of the present invention are shown. As those skilled in the art would realize, the described embodiments may be modified in various different ways, all without departing from the spirit or scope of the present invention.

To more clearly describe the present disclosure, portions of the below-described embodiments which are not necessary for one of ordinary skill in the art to understand the present invention may be omitted, and like reference numerals designate like elements throughout the specification.

Further, sizes and thicknesses of components shown in the drawings may be arbitrarily shown for better understanding and ease of description, and the present disclosure is not limited thereto.

It will be understood that when an element, such as a layer, film, region, or substrate, is referred to as being "on" another element, it can be directly on the other element or intervening elements may also be present. Similarly, it will be understood that when an element or layer is referred to as being "on," "connected to," or "coupled to" another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements.

In addition, unless explicitly described to the contrary, the words "include" and "comprise," and variations such as "includes," "including," "comprises," and "comprising," will be understood to imply the inclusion of stated elements but not the exclusion of any other elements. An upper part of a target portion indicates an upper part or a lower part of the target portion and is not limited to a gravitational direction. It will be further understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments.

As used herein, the term "and/or" includes any and all combinations of one or more of the associated listed items. Further, the use of "may" when describing embodiments of the present invention relates to "one or more embodiments of the present invention." Expressions, such as "at least one of," when preceding a list of elements, modify the entire list of elements and do not modify the individual elements of the list. Also, the term "exemplary" is intended to refer to an example or illustration. As used herein, the terms "use," "using," and "used" may be considered synonymous with the terms "utilize," "utilizing," and "utilized," respectively.

Also, any numerical range disclosed and/or recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112(a) and 35 U.S.C. § 132(a).

Hereinafter, an electrode assembly and a rechargeable battery according to exemplary embodiments of the present invention will be described in detail with reference to the accompanying drawings.

Figure 2:
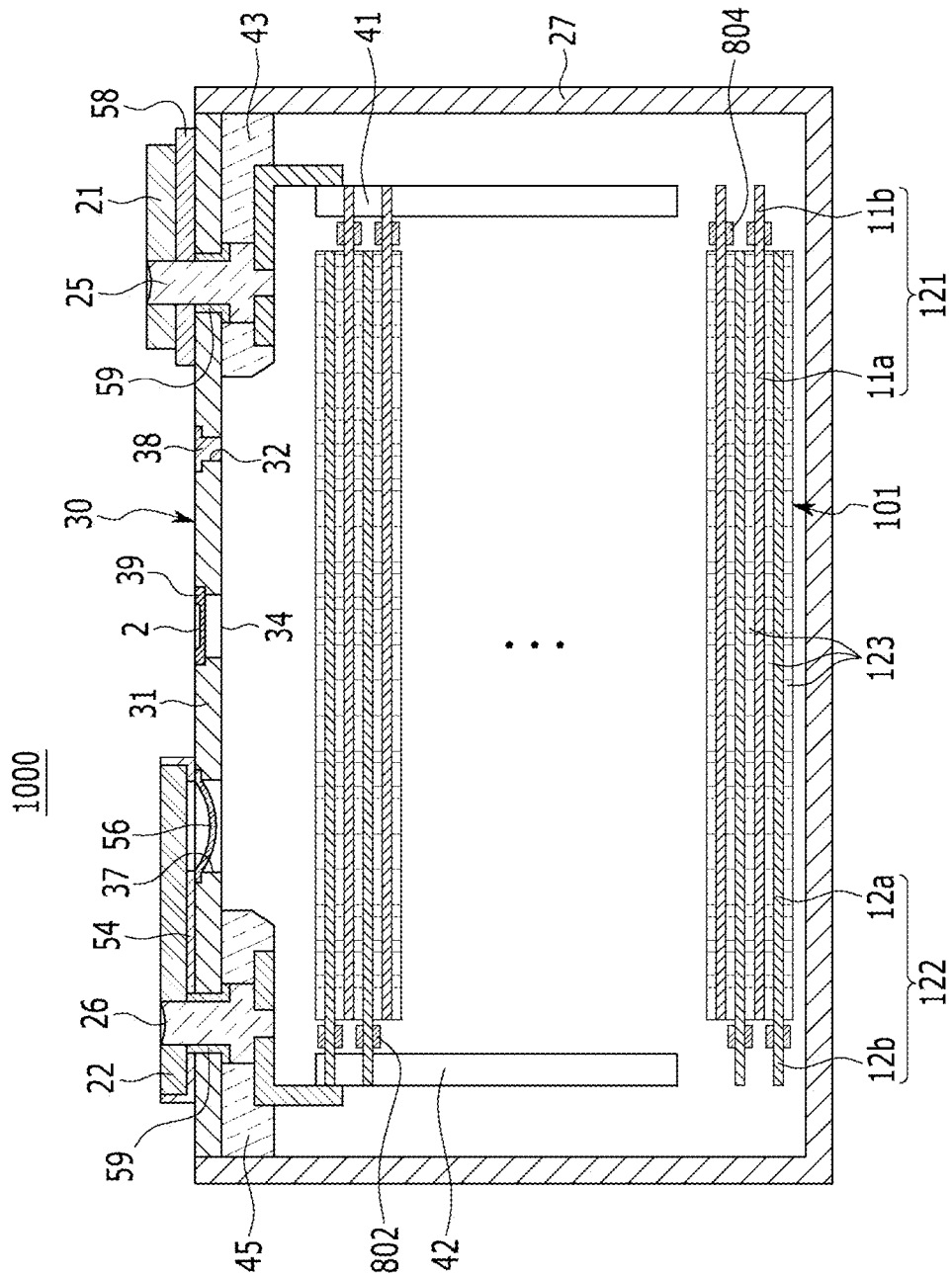
FIG. 2 is a cross-sectional view taken along the line II-II of FIG. 1.
Figure 3:
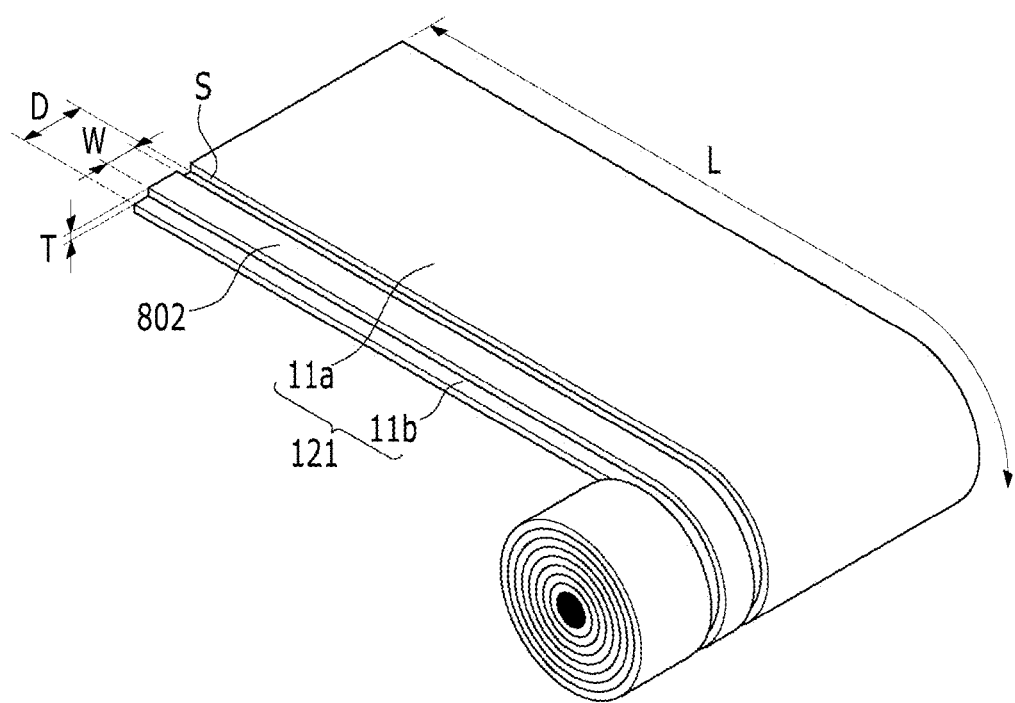
FIG. 3 is a schematic view of a step of forming a foreign particle preventing member according to an exemplary embodiment of the present invention.
Figure 4:
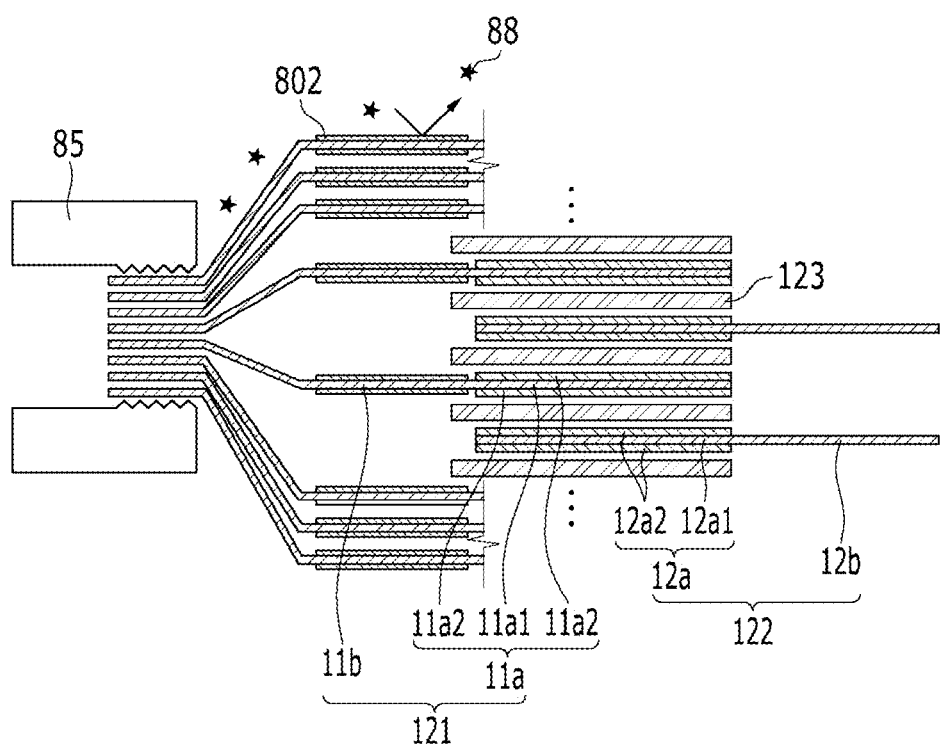
FIG. 4 is a schematic view for explaining ultrasonic welding according to an exemplary embodiment of the present invention.

FIG. 1 is a schematic perspective view of an electrode assembly for a rechargeable battery according to an exemplary embodiment of the present invention, FIG. 2 is a cross-sectional view taken along the line II-II of FIG. 1, FIG. 3 is a schematic view of a step of forming a foreign particle preventing member according to an exemplary embodiment of the present invention, and FIG. 4 is a schematic view for explaining ultrasonic welding according to an exemplary embodiment of the present invention.

As shown in FIGS. 1-3, a rechargeable battery 1000 according to an exemplary embodiment of the present invention includes an electrode assembly 101, a case 27 accommodating the electrode assembly 101 together with an electrolyte solution, and a cap assembly 30 sealing an opening of the case 27. The rechargeable battery 1000 according to an exemplary embodiment of the present invention will be exemplarily described as being a lithium ion rechargeable battery having a prismatic shape; however, the present invention is not limited thereto, and the lithium ion rechargeable battery may have a pouch case according to other embodiments of the present invention.

The electrode assembly 101 includes a first electrode 121, a second electrode 122, and a separator 123 interposed between the first electrode 121 and the second electrode 122. Because the separator 123 is an insulator, the first electrode 121, the separator 123, the second electrode 122, and the separator 123 may be sequentially stacked.

The electrode assembly 101 in which the first electrode 121, the separator 123, and the second electrode 122 are stacked may have a jellyroll shape by being spirally wound about a winding axis. In some embodiments, the electrode assembly 101 may be pressed to be flat or flattened after being spirally wound to have an oval cross-sectional shape.

The first electrode 121 includes a first electrode coated region 11a and a first electrode uncoated region 11b, and the second electrode 122 includes a second electrode coated region 12a and a second electrode uncoated region 12b. For example, the first electrode 121 may be a positive electrode, and the second electrode 122 may be a negative electrode.

The first electrode coated region 11a may be formed by coating an active material, such as a transition metal oxide, on a substrate made of a metal foil, such as aluminum, and the second electrode coated region 12a may be formed by coating an active material, such graphite or carbon, on a substrate made of a metal foil, such as copper or nickel.

Referring to FIG. 4, the first electrode coated region 11a may include a substrate 11a1 and an active material layer 11a2, and the second electrode coated region 12a may include a substrate 12a1 and an active material layer 12a2.

The substrates of the first electrode coated region and the second electrode coated region 11a1 and 12a1 provide a moving passage for charges generated in the active material layers and support the active material layers.

The first electrode uncoated region 11b and the second electrode uncoated region 12b may not include an active material layer and may be portions extending from coated regions of the substrates of the first and second electrode, respectively. The first electrode uncoated region 11b may be disposed at one lateral end of the first electrode 121 along a length direction of the first electrode 121, and the second electrode uncoated region 12b may be disposed at one lateral end of the second electrode 122 along a length direction of the second electrode 122.

In the jellyroll electrode assembly, the first electrode uncoated region 11b and the second electrode uncoated region 12b may be opposite each other based on the first and second electrode coated regions 11a and 12a.

A first foreign particle preventing member 802 is positioned on the first electrode uncoated region 11a at where the first electrode coated region 11a and the first electrode uncoated region 11b meet. The first foreign particle preventing member 802 is positioned outside a boundary of the first electrode coated region 11a and is attached onto the first electrode uncoated region 11b of the substrate 11a1. Although the first foreign particle preventing members 802 is illustrated as being disposed on opposite surfaces of the first electrode uncoated region 11b, the present invention is not limited thereto. In other embodiments, the first foreign particle preventing member 802 may be disposed on only one of upper and lower surfaces of the first electrode uncoated region 11b.

The first foreign particle preventing member 802 is disposed along a first boundary between the first electrode coated region 11a and the first electrode uncoated region 11b. Accordingly, the first foreign particle preventing member 802 may be formed to have a narrow band shape with a width W, and the width W in a direction parallel to a winding axis for winding the electrode assembly is smaller than a length L thereof in a direction crossing the winding axis.

A distance D from an end portion of the first electrode uncoated region 11b to a first boundary S at which the first electrode coated region 11a and the first electrode uncoated region 11b meet is greater than the width W of the first foreign particle preventing member 802 such that the first electrode uncoated region 11b is partially exposed. The exposed first electrode uncoated region 11b is electrically connected to a current collecting portion for drawing out a current to outside of the case 27.

A second foreign particle preventing member 804 is positioned between the second electrode coated region 12a and the second electrode uncoated region 12b of the substrate 12a1. The second foreign particle preventing member 804 may be formed by the same or substantially similar method as that used to form the first foreign particle preventing member 802.

The second foreign particle preventing member 804 is positioned outside a boundary of the second electrode coated region 12a and is attached onto the second electrode uncoated region 12b of the substrate 12a1. The second foreign particle preventing member 804 may be disposed on one surface or on both opposite surfaces of the second electrode uncoated region 12b of the substrate 12a1. Although the second foreign particle preventing member 804 is illustrated as being disposed on opposite surfaces of the second electrode uncoated regions 12b, the present invention is not limited thereto. In other embodiments, the second foreign particle preventing member 804 may be disposed on only one of upper and lower surfaces of the second electrode uncoated region 12b.

The second foreign particle preventing member 804 is disposed along a second boundary between the second electrode coated region 12a and the second electrode uncoated region 12b. Accordingly, the second foreign particle preventing member 804 may be formed to have a narrow band shape with a width in the direction parallel to the winding axis for winding the electrode assembly, and the width of the second foreign particle preventing member 804 is smaller than a length thereof in the direction crossing the winding axis.

A distance from an end portion of the second electrode uncoated region 12b to the second boundary is greater than the width of the second foreign particle preventing member 804 such that the second electrode uncoated region 12b is partially exposed. The exposed second electrode uncoated region 12b is electrically connected to the current collecting portion for drawing out a current to outside the case 27.

Referring to FIG. 3, the width W of the first foreign particle preventing member 802 and the width of the second foreign particle preventing member 804 are each in a range of about 1 mm to about 10 mm and may be formed by continuous adhesive tapes. In another embodiment, the first foreign particle preventing member 802 and the second foreign particle preventing member 804 may be formed by coating an insulation resin having a width (e.g., having the width W) in a range of about 0.3 mm to about 10 mm. The first foreign particle preventing member 802 and the second foreign particle preventing member 804 may be respectively formed to have a thickness T in a range of about 5 μm to about 40 μm. For example, the first foreign particle preventing member 802 and the second foreign particle preventing member 804 may be an adhesive acryl or a silicon tape that is formed on a substrate including PET, PI, and/or PE or may be formed of an insulation resin including acryl and/or silicon.

When the first foreign particle preventing member 802 and/or the second foreign particle preventing member 804 is formed according to an exemplary embodiment of the present invention, foreign particles generated during a welding process may be prevented or impeded from flowing into the electrode assembly.

Referring to FIG. 4, in the spiral-wound electrode assembly, a plurality of electrode uncoated regions having the same polarities overlap each other and are welded by ultrasonic waves to be electrically connected to each other.

For example, when the first electrode uncoated regions 11b are welded by using an ultrasonic welding horn 85, vibration occurs causing foreign particles, such as metal particles 88, to be generated from the first electrode uncoated regions 11b. The foreign particles may move into the electrode assembly during the welding process. However, when the first foreign particle preventing member 802 is formed according to an exemplary embodiment of the present invention, movement of the foreign particles is blocked by the first foreign particle preventing member 802 to prevent the foreign particles from flowing into the electrode assembly and causing a short circuit or the like.

Referring back to FIGS. 1 and 2, the separator 123 has high ion transmittance and may be made of a porous film with good mechanical strength. For example, the separator 123 may be made of an olefin-based polymer, such as polyethylene, polypropylene, etc. The separator 123 extends longer (e.g., extends beyond) than the first electrode coated region 11a and/or the second electrode coated region 12a along a length direction and/or a width direction, thereby preventing or reducing chances of a short circuit between the first electrode coated region 11a and the second electrode coated region 12a from occurring due to, for example, thermal contraction.

The electrode assembly 101 may be accommodated in the case 27 together with an electrolyte solution. The electrolyte solution may include (or may be composed of) an organic solvent, such as ethylene carbonate (EC), propylene carbonate (PC), diethyl carbonate (DEC), and ethyl methyl carbonate (EMC), and a lithium (Li) salt, such as $LiPF_6$ and $LiBF_4$. The electrolyte solution may be in a liquid, solid, or gel state.

The case 27 is substantially cuboidal and includes an opening at one side thereof.

The case 27 may be made of a metal, such as aluminum.

The cap assembly 30 includes a cap plate 31 combined to the case 27 to close the opening of the case 27, a first terminal 21 outside of the cap plate 31 and electrically connected to the first electrode 121, and a second terminal 22 outside of the cap plate 31 and electrically connected to the second electrode 122.

The cap plate 31 has a plate shape extending in (e.g., primarily extending in) a direction and is combined to the case 27 at the opening thereof. The cap plate 31 includes an injection opening (e.g., an injection hole) 32 and a vent opening (e.g., a vent hole) 34 penetrating to the inside of the case 27. The electrolyte solution is injected into the case 27 through the injection opening 32, and after the electrolyte solution is injected into the case 27, a sealing stopper 38 is provided in the injection opening 32 to seal the injection opening 32. A vent member 39 is provided in the vent opening 24 and includes a notch 2 such that the vent member 39 may open at a reference pressure (e.g., a predetermined pressure).

The first terminal 21 and the second terminal 22 are installed to be at an upper portion of (e.g., to be on an upper or outer surface of) the cap plate 31. The first terminal 21 is electrically connected to the first electrode 121 through a first current collecting portion 41, and the second terminal is electrically connected to the second electrode 122 through a second current collecting portion 42.

A terminal connecting member 25 electrically connecting the first terminal 21 to the first current collecting portion 41 is installed between the first terminal 21 and the first current collecting portion 41 and protrudes through the cap plate 31.

The terminal connecting member 25 is inserted into an opening (e.g., a hole) provided in the first terminal 21, and an upper portion thereof is fixed to the first terminal 21 by, for example, welding, and a lower portion thereof is fixed to the first current collecting portion 41 by, for example, welding. A metal plate 58 electrically connecting the first terminal 21 to the cap plate 31 is positioned between the first terminal 21 and the cap plate 31. The terminal connecting member 25 is installed to pass through the metal plate 58, and thus, the cap plate 31 and the case 27 may be charged by (e.g., may be electrically connected to) the first electrode 121.

A gasket 59 is inserted into an opening in the cap plate 31 through which the terminal connecting member 25 passes and is arranged between the terminal connecting member 25 and the cap plate 31 to seal therebetween. A lower insulation member 43 into which a lower portion of the terminal connecting member 25 is inserted is installed below the cap plate 31.

A terminal connecting member 26 electrically connecting the second terminal 22 to the second current collecting portion 42 is installed between the second terminal 22 and the second current collecting portion 42.

The terminal connecting member 26 is inserted into an opening (e.g., a hole) formed in the second terminal 22, its upper portion is fixed to the second terminal 22 by, for example, welding, and its lower portion is fixed to the second current collecting portion 42 by, for example, welding. An upper insulating member 54 electrically insulating the second terminal 22 from the cap plate 31 is installed between the second terminal 22 and the cap plate 31. The upper insulating member 54 may be formed to surround a lateral wall of the second terminal 22. The terminal connecting member 26 is installed to pass through the upper insulating member 54.

Another gasket 59 is inserted into an opening in the cap plate 31 through which the terminal connecting member 26 passes and is arranged between the terminal connecting member 26 and the cap plate 31 to seal therebetween. A lower insulation member 45 into which a lower portion of the terminal connecting member 26 is inserted is positioned below the cap plate 31.

The cap assembly 30 is provided with a short-circuit opening (e.g., a short-circuit hole) 37, and a short-circuit member 56 for selectively short-circuiting the first electrode 121 and the second electrode 122 to each other is installed in the short-circuit opening 37.

The short-circuit member 56 includes a cutout formed in the upper insulating member 54 at a portion corresponding to the short-circuit opening 37. The short-circuit member 56 may overlap the exposed second terminal 22 through the cutout while being spaced from (e.g., spaced apart from) the exposed second terminal 22. The short-circuit member 56 includes a curved portion convexly curved toward the electrode assembly 101 and an edge portion outside (e.g., surrounding a periphery of) the curved portion and fixed to the cap plate 31.

When internal pressure of the rechargeable battery 1000 increases (e.g., increases to greater than a reference pressure), the short-circuit member 56 deforms to cause a short-circuit. For example, when gas is generated in the case 27 due to an abnormal reaction in the electrode assembly 101, the internal pressure of the rechargeable battery 1000 increases. When the internal pressure of the rechargeable battery exceeds the reference pressure, the curved portion of the short-circuit member 56 deforms to become convex in an opposite direction to directly contact the second terminal 22 to cause a short circuit.

Figure 5:
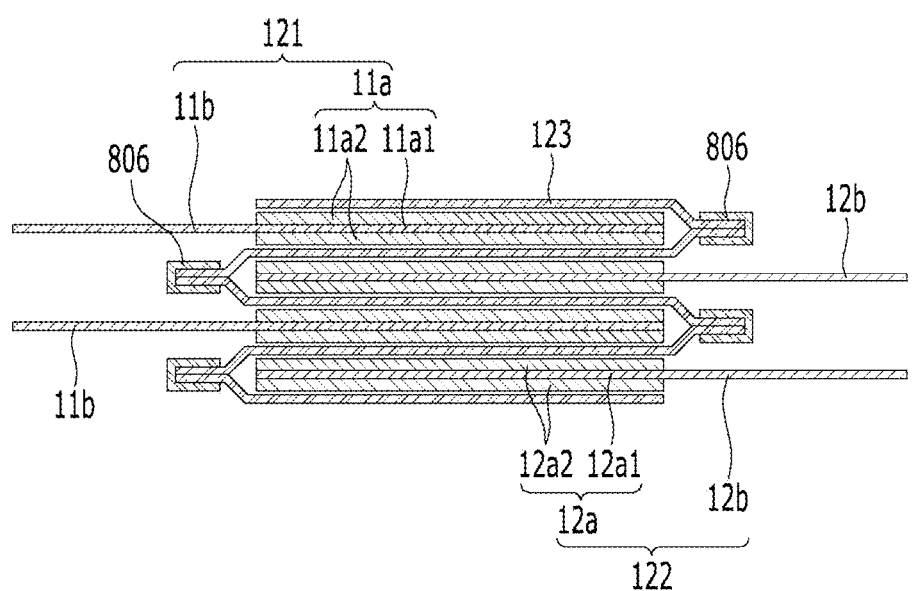
FIGS. 5 and 6 are schematic cross-sectional views of an electrode assembly according to another exemplary embodiment of the present invention.
Figure 6:
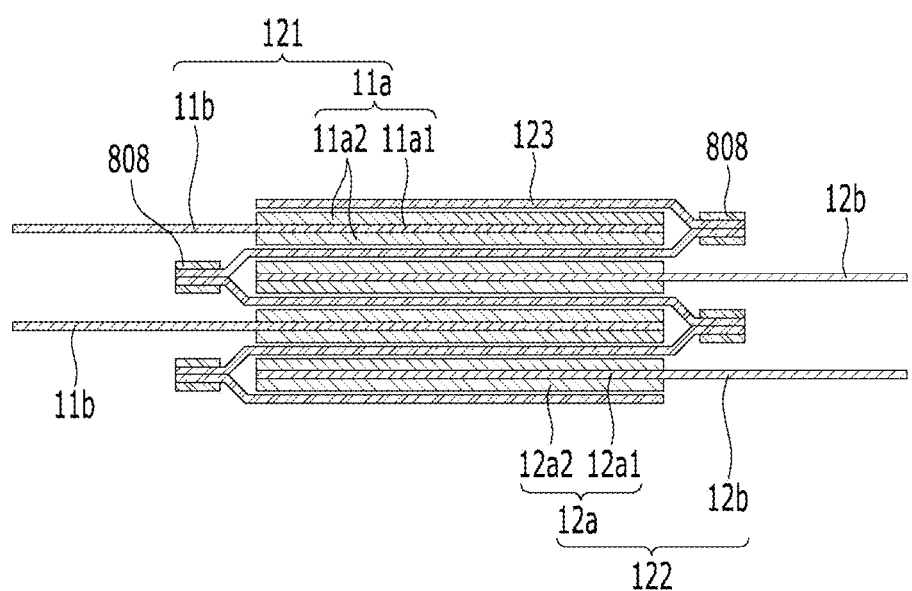

FIGS. 5 and 6 schematically illustrate cross-sectional views of an electrode assembly according to another exemplary embodiment of the present invention.

For ease of explanation, different aspects and components between the electrode assembly shown in FIG. 5 and the electrode assembly shown in FIGS. 1-4 will be primarily described in detail.

The electrode assembly shown in FIG. 5 includes the first electrode 121, the separator 123, and the second electrode 122 that are repeatedly wound about the winding axis to have a jellyroll shape. Different from the electrode assembly shown in FIGS. 1-4, the first electrode uncoated region 11*b* and the second electrode uncoated region 12*b* of the electrode assembly shown in FIG. 5 do not include the foreign particle preventing member.

A third foreign particle preventing member 806 is disposed at an edge of the separator 123 of the electrode assembly shown in FIG. 5.

The third foreign particle preventing member 806 may be formed by the same method and with the same material as the first foreign particle preventing member 801 and the second foreign particle preventing member 802.

Third foreign particle preventing members 806 may be formed on one surface and another surface of the edge of the separator, and in this case, the third foreign particle preventing members 806 may be integrally formed to surround an end portion of the separator.

However, the present invention is not limited thereto, and as shown in FIG. 6, fourth foreign particle preventing members 808 may be formed on one surface or another surface of the separator so that the end portion of the separator may be exposed.

Figure 7:
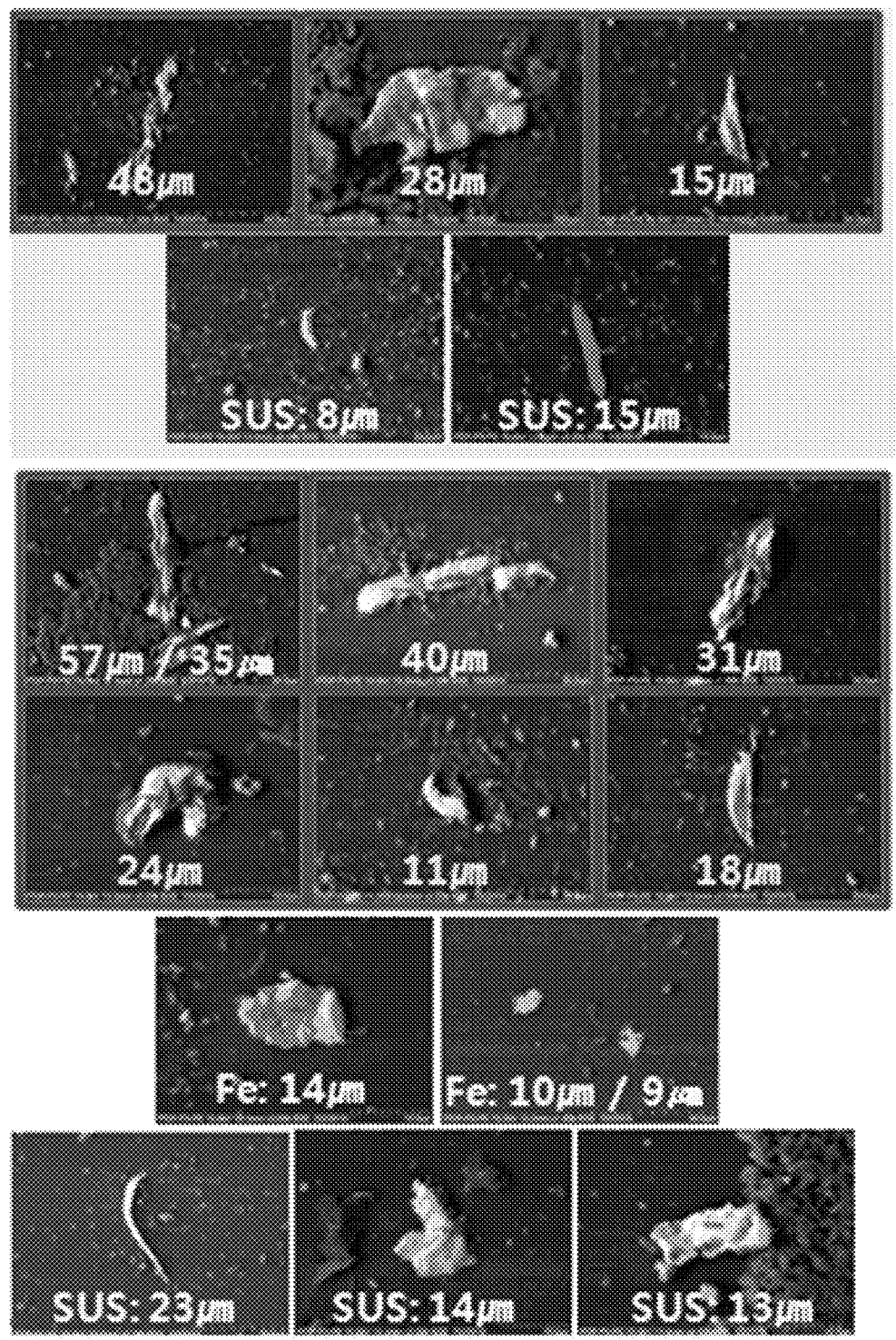
FIG. 7 includes photographs of foreign particles detected after a welding process of Comparative Example 1.
Figure 8:
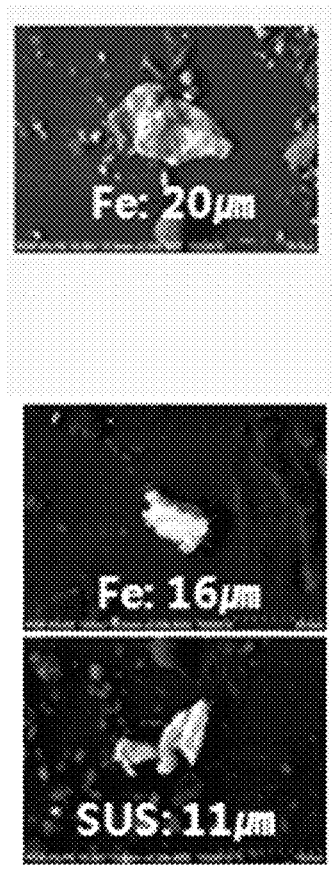
FIGS. 8 and 9 include photographs of foreign particles detected after welding processes of Examples 1 and 2 according to embodiments of the present invention.
Figure 9:
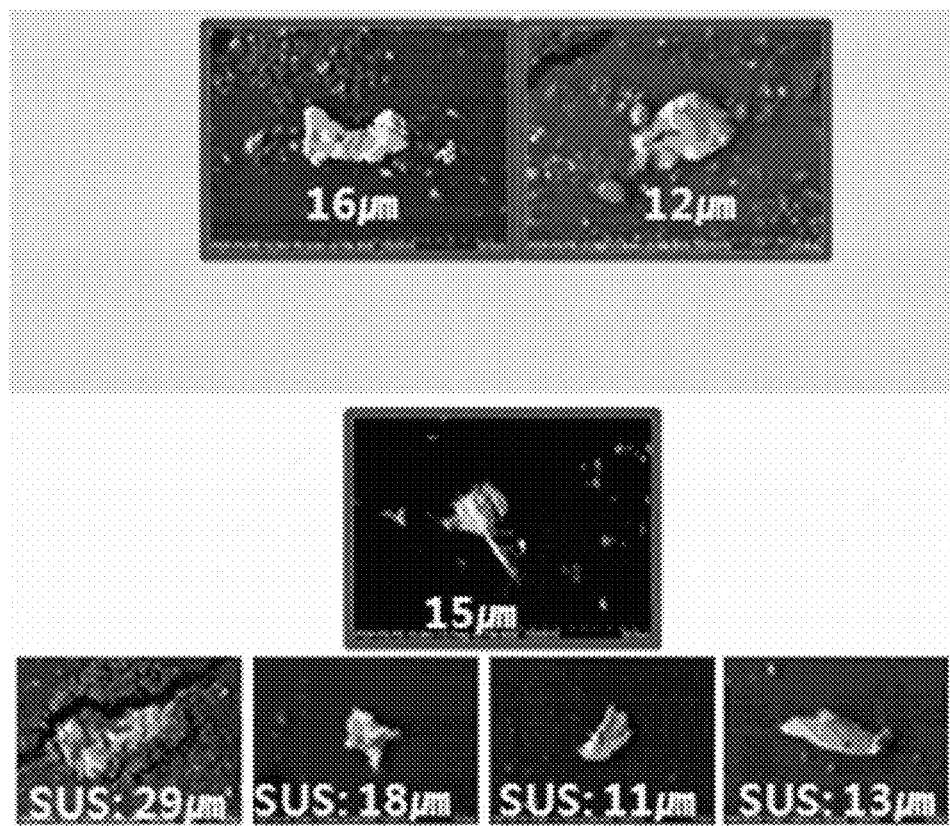

FIG. 7 includes photographs of foreign particles detected after a welding process of Comparative Example 1, and FIGS. 8 and 9 include photographs of foreign particles detected after welding processes of Examples 1 and 2 according to embodiments of the present invention.

In Comparative Example 1 and Examples 1 and 2, the positive electrode uncoated region is welded by using ultrasonic welding, and the ultrasonic welding is performed at a pressure of about 300 KPa and an amplitude of about 100% for about 0.3 s. Welding positions of Comparative Example 1 and Example 1 are both about 4 mm, and a welding position of Example 2 is about 3 mm. In these examples, the welding positions are away from the boundary of the electrode coated region by about 4 mm and about 3 mm, respectively.

In Comparative Example 1, 9 copper particles, 2 iron particles, and 5 SUS particles are detected as foreign particles; in Example 1, no copper particles, 2 iron particles, and 1 SUS particle are detected; and in Example 2, 3 copper particles, no iron particles, and 4 SUS particles are detected.

As such, 16 foreign particles are detected in Comparative Example 1, while 3 and 7 foreign particles are respectively detected in Examples 1 and 2. Thus, it can be seen that the foreign particles are significantly reduced in Examples 1 and 2 compared to Comparative Example 1.

In addition, sizes of the foreign particles detected in Comparative Example 1 are primarily in a range of about 10 μm to about 50 μm, while sizes of the foreign particles detected in Examples 1 and 2 are primarily in a range of about 10 μm to about 20 μm. Thus, it can be seen that the foreign particles in Examples 1 and 2 are smaller than those in Comparative Example 1.

While the present invention has been described in connection with what is presently considered to be practical exemplary embodiments, it is to be understood that the present invention is not limited to the disclosed embodiments but is intended to cover various modifications and

DESCRIPTION OF SOME REFERENCE SYMBOLS

| | |
|---|---|
| 2: notch | 11a, 12a: electrode coated region |
| 11b, 12b: electrode uncoated region | 21: first terminal |
| 22: second terminal | 25, 26: terminal connecting member |
| 27: case | 30: cap assembly |
| 31: cap plate | 32: injection opening |
| 34: vent opening | 37: short-circuit opening |
| 38: sealing cap | 39: vent member |
| 41, 42: current collecting portion | 43, 45: lower insulating member |
| 56: short-circuit member | 58: metal plate |
| 59: gasket | 85: horn |
| 88: particle | 101: electrode assembly |
| 121: first electrode | 122: second electrode |
| 123: separator | |
| 802, 804, 806, 808: foreign particle preventing member | |
| 1000: rechargeable battery | |

What is claimed is:

1. An electrode assembly comprising:
a first electrode comprising a first electrode coated region and a first electrode uncoated region at one side of the first electrode coated region;
a separator overlapping the first electrode;
a second electrode comprising a second electrode coated region and a second electrode uncoated region at one side of the second electrode coated region, the second electrode coated region overlapping the first electrode coated region with the separator therebetween; and
a foreign particle preventing member on at least one of the first electrode uncoated region or the second electrode uncoated region, the foreign particle preventing member extending repeatedly around an axis together with the first electrode, the separator, and the second electrode.

2. The electrode assembly of claim 1, wherein the foreign particle preventing member extends along a first boundary between the first electrode coated region and the first electrode uncoated region or along a second boundary between the second electrode coated region and the second electrode uncoated region.

3. The electrode assembly of claim 2, wherein a width of the foreign particle preventing member in a direction parallel to the axis is smaller than a length thereof in a direction crossing the axis.

4. The electrode assembly of claim 3, wherein a distance from an end of the first electrode uncoated region to the first boundary is greater than the width of the foreign particle preventing member or a distance from the second electrode uncoated region to the second boundary is greater than the width of the foreign particle preventing member.

5. The electrode assembly of claim 3, wherein the foreign particle preventing member comprises an adhesive tape.

6. The electrode assembly of claim 5, wherein the width of the foreign particle preventing member is in a range of about 1 mm to about 10 mm.

7. The electrode assembly of claim 3, wherein the foreign particle preventing member comprises an insulation resin.

8. The electrode assembly of claim 7, wherein the width of the foreign particle preventing member is in a range of about 0.3 mm to about 10 mm.

9. The electrode assembly of claim 1, wherein the foreign particle preventing member is both opposite surfaces of the at least one of the first electrode uncoated region or the second electrode uncoated region.

10. The electrode assembly of claim 1, wherein the first electrode uncoated region and the second electrode uncoated region are at opposite sides of the electrode assembly with respect to the first electrode coated region and the second electrode coated region.

11. The electrode assembly of claim 1, further comprising another foreign particle preventing member on the separator and at an edge of the separator.

12. An electrode assembly comprising:
a first electrode comprising a first electrode coated region and a first electrode uncoated region at one side of the first electrode coated region;
a separator overlapping the first electrode;
a foreign particle preventing member on the separator and at an edge of the separator; and
a second electrode comprising a second electrode coated region and a second electrode uncoated region at one side of the second electrode coated region, the second electrode coated region overlapping the first electrode coated region with the separator therebetween,
wherein the foreign particle preventing member extends repeatedly around an axis together with the first electrode, the separator, and the second electrode.

13. The electrode assembly of claim 12, wherein the foreign particle preventing member surrounds an end portion of the separator.

14. The electrode assembly of claim 12, wherein the foreign particle preventing member is on opposite surfaces of the separator.

15. The electrode assembly of claim 12, wherein the foreign particle preventing member comprises an adhesive tape or an insulation resin.

16. The electrode assembly of claim 15, wherein a width of the foreign particle preventing member in a direction parallel to the axis is about 10 mm or less.

17. A rechargeable battery comprising:
an electrode assembly comprising first and second electrodes and a separator between the first electrode and the second electrode, each of the first and second electrodes comprising an electrode uncoated region and an electrode coated region;
a foreign particle preventing member on the electrode uncoated regions of at least one of the first and second electrodes, the first electrode, the second electrode, the separator, and the foreign particle preventing member extending repeatedly around an axis;

a case accommodating the electrode assembly and having an opening at one side thereof; and a cap plate coupled to the case at the opening.

18. The rechargeable battery of claim 17, wherein the foreign particle preventing member extends along a first boundary between the first electrode coated region and the first electrode uncoated region or along a second boundary between the second electrode coated region and the second electrode uncoated region.

19. The rechargeable battery of claim 17, wherein the foreign particle preventing member comprises an adhesive tape or an insulation resin.

20. The rechargeable battery of claim 19, wherein a width of the foreign particle preventing member in a direction parallel to the axis is about 10 mm or less.

* * * * *